United States Patent [19]
Pickens et al.

[11] Patent Number: 5,662,795
[45] Date of Patent: Sep. 2, 1997

[54] SWIMMING POOL CHEMICAL DISPENSER

[75] Inventors: Stanley R. Pickens, Monroeville; Paul T. Rice, Sewickley, both of Pa.; Richard H. Ferguson, New Martinsville, W. Va.

[73] Assignee: PPG Industries, Inc., Pittsburgh, Pa.

[21] Appl. No.: 574,879

[22] Filed: Dec. 19, 1995

[51] Int. Cl.⁶ ............... B01D 11/02; C02F 1/76
[52] U.S. Cl. ............ 210/169; 210/198.1; 137/268; 422/261; 422/265
[58] Field of Search ............... 210/169, 198.1; 422/265, 261; 137/268

[56]  References Cited

U.S. PATENT DOCUMENTS

| | | | |
|---|---|---|---|
| 1,737,377 | 11/1929 | Kolb. | |
| 1,923,266 | 4/1933 | Houpert | 299/83 |
| 4,450,594 | 5/1984 | Hotchkin | 4/228 |
| 4,643,881 | 2/1987 | Alexander et al. | 422/265 |
| 4,702,270 | 10/1987 | King, Sr. | 137/268 |
| 4,763,685 | 8/1988 | King, Sr. | 137/268 |
| 4,825,528 | 5/1989 | Nicholson et al. | 29/453 |
| 4,842,729 | 6/1989 | Buchan | 210/198.1 |
| 4,917,868 | 4/1990 | Alexander et al. | 422/119 |
| 5,089,127 | 2/1992 | Junker et al. | 210/206 |
| 5,133,381 | 7/1992 | Wood et al. | 137/268 |
| 5,218,983 | 6/1993 | King | 137/1 |
| 5,384,102 | 1/1995 | Ferguson et al. | 210/169 |
| 5,385,044 | 1/1995 | Thomas et al. | 73/295 |

*Primary Examiner*—Neil McCarthy
*Attorney, Agent, or Firm*—Irwin M. Stein

[57]  ABSTRACT

Describes apparatus for dispensing a sanitizing chemical into a swimming pool. The apparatus is a container having a closed bottom, a lid with a dispensing opening, and a plate with colored markings that is larger than the dispensing opening and freely moveable vertically resting on the bottom of the container. The plate has a specific gravity of less than 1.0. In operation, the container is filled with solid sanitizing chemical, e.g., calcium hypochlorite, and placed in a skimmer basket associated with the pool. When the sanitizing chemical is completely dissolved by water pumped through the skimmer basket and recycled to the pool, the plate floats to the top of the container where it can be observed readily to indicate that the apparatus needs to be refilled with sanitizing chemical.

10 Claims, 1 Drawing Sheet

5,662,795

SWIMMING POOL CHEMICAL DISPENSER

DESCRIPTION OF THE INVENTION

The present invention relates generally to devices for dispensing chemicals into swimming pools to maintain the quality and clarity of water therein, and more particularly, relates to a dispenser for dispensing solid swimming pool chemicals when the dispenser is placed in a skimmer basket associated with the pool and is immersed in water.

Untreated water in both above-ground and below-ground swimming pools tends to deteriorate relatively rapidly due to the growth of bacteria and other organic matter, such as algae, which results in such water becoming both unsanitary and hazy. When pool water remains untreated for several days, it can present a health hazard to swimmers and a clean-up problem due to the growth of algae on the surface of the pool.

Water soluble sanitizing agents and bactericides are added regularly to swimming pool water to kill bacteria and inhibit the growth of organic matter so that a safe and comfortable swimming environment can be maintained. Chlorine or compounds of chlorine, such as calcium hypochlorite and trichloroisocyanurates, are used typically for this purpose.

A variety of methods have been used to add sanitizing agents, such as calcium hypochlorite, to swimming pools. The simplest approach has been to manually broadcast granular calcium hypochlorite onto the surface of the pool water. As the granular particles of calcium hypochlorite sink towards the bottom of the pool, they dissolve and sanitize the water. Another method that has been used is to supply a solution of calcium hypochlorite through an in-line flow circuit. See, for example, U.S. Pat. No. 5,089,127. Still another method for introducing swimming pool chemicals into swimming pool water is by use of floating feeders, which are designed for carrying solid tablets or pellets of the chemical below the water surface while the device floats in the pool.

Another common method for dispensing calcium hypochlorite into pool water is the use of a pool chemical dispenser that holds solid chemical tablets or pellets of the chemical and that is placed within a skimmer associated with the pool. A skimmer is a device for removing debris from pool water and is positioned typically adjacent to the pool or is integrated into the side of a pool. Water removed from the pool by action of a pump is introduced into the skimmer where it contacts and dissolves calcium hypochlorite stored in the dispenser, thereby forming a solution of calcium hypochlorite or other pool sanitizing chemical. The resultant dilute aqueous solution of calcium hypochlorite is drawn through a perforated removable basket within the skimmer, pumped to a filter downstream of the skimmer, and subsequently returned to the pool.

When the dispenser containing the solid pool sanitizing chemical is placed within the skimmer basket and is covered with water flowing through the skimmer, it is difficult to determine when the dispenser is empty and needs to be refilled. In practice, the pool user commonly removes the dispenser from the skimmer basket and visually checks the amount of swimming pool chemical that remains in it.

Accordingly, a need exists to provide a visual indication that the dispenser has little or no swimming pool chemical remaining and needs to be refilled. The visual indicator should be so readily apparent that even a casual glance within the skimmer will indicate to an observer that the dispenser needs to be refilled. In attaining this objective, no significant additional parts that would raise the production cost of the dispenser should be required. Rather, the design should be as simple as possible, yet provide a readily apparent visual indicator, as described hereinabove. Further, the means for attaining the objective should have a life expectancy at least as long as the dispenser; and finally, the objective must be attained while incurring no relative disadvantages.

The features that characterize the present invention are pointed out with particularity in the claims, which are annexed hereto and form a part of this disclosure. Those and other features of the invention, its operating advantages and the specific objects obtained by its use will be more fully understood from the following detailed description and the accompanying drawings in which preferred embodiments of the invention are illustrated and described, and in which like reference characters designate corresponding parts.

Other than in the operating examples or where otherwise indicated, all numbers and ranges in the detailed description and claims expressing quantities of ingredients or reaction conditions are to be understood as modified in all circumstances by the term "about".

DETAILED DESCRIPTION OF THE INVENTION

Figure 1:
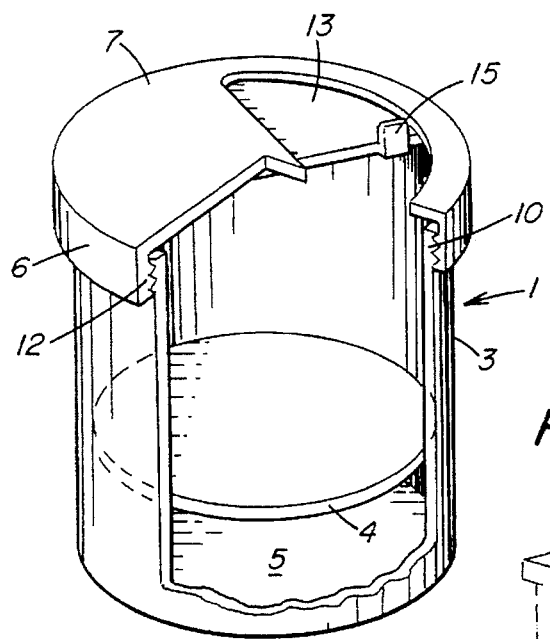
FIG. 1 is a 90° cutaway of one embodiment of a pool chemical dispenser of the present invention.
Figure 2:
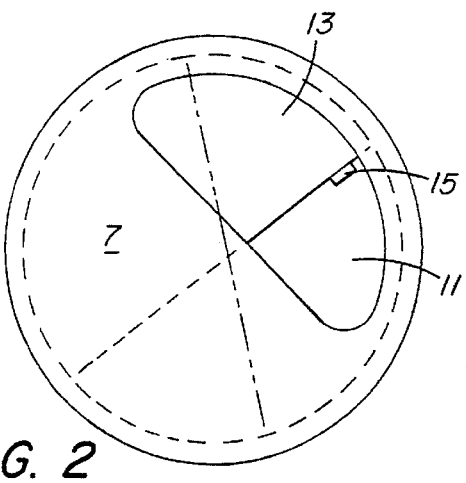
FIG. 2 is a top planar view of FIG. 1 showing an adjustable closure plate in the half-open position, a broken line illustrating another position.

In accordance with the present invention and with reference to FIGS. 1 and 2, there is provided a dispenser for dispensing a solid swimming pool chemical into water when the dispenser is immersed therein comprising, in combination, a container 1 for holding the pool chemical, said container having a side 3, a closed bottom 5 and a lid 7 having a dispensing opening 11 and a vertically movable plate member 4 having a specific gravity of less than 0.1. Plate member 4 is of a color or has color markings that are readily discernible when the plate member is in container 1 and is covered with water. Plate member 4 preferably has a size larger than the dispensing opening in the lid and is freely movable vertically, i.e., in a direction perpendicular to the horizontal plane of the plate member.

As shown in FIG. 1, container 1 is represented as a cylinder, but it can be of any suitable geometric shape or design so long as it is of a size and shape which allows it to fit within the skimmer. Typically, container 1 is a cylinder about 3 to 3.5 inches (7.6 to 8.9 centimeters) in diameter and about 4 inches (10.2 centimeters) in height. Such a size can accommodate easily solid calcium hypochlorite tablets nominally 3 inches (7.6 centimeters) or less, e.g., 0.75 inches (1.9 centimeters), in diameter, and fit easily into a conventional pool skimmer.

Figures 4, 5:
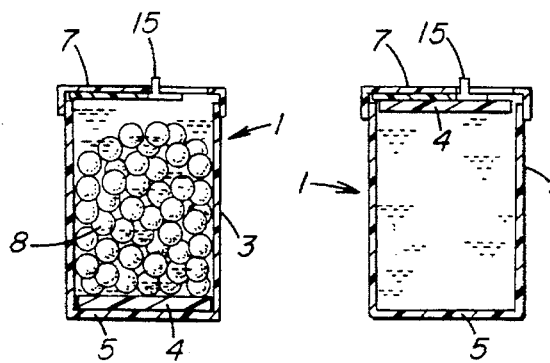
FIG. 4 is a side elevation of FIG. 1 filled with pellets of solid sanitizing pool chemical and an indicator plate member on the bottom of the dispenser below the pellets.
FIG. 5 is a side elevation of FIG. 1 showing the dispenser devoid of sanitizing pool pellets and filled with water, with the indicator plate member at the top of the dispenser.

Further, in FIG. 1 plate member 4 is shown spaced from the bottom 5 of container 1 for purposes of exemplification. In operation, plate member 4 is contiguous to the inner face of bottom 5 when the container is loaded with solid pool sanitizing chemical. It rises vertically, as shown in FIGS. 1 and 5 when the weight of the solid chemical pellets or tablets is insufficient to keep it on the bottom of container 1, eventually rising to the top of container 1 directly beneath top 7 when the solid chemical is substantially dissolved.

Dispensing container 1 and its lid 7 may be fabricated from any suitable material that is chemically resistant to the swimming pool chemical, e.g., calcium hypochlorite, placed within the container. Examples of materials of construction that may be used include polyethylene, polypropylene, poly (vinyl chloride), chlorinated poly(vinyl chloride), ABS (acrylonitrile-butadiene-styrene resin), fiberglass-reinforced resins and polystyrene. The specific gravity of the container is not critical and may be less than or greater than 0.1. Preferably, the container will be fabricated from a thermoplastic resin such as polypropylene by means of injection molding and will have a specific gravity of more than 1.0, but it may have a specific gravity of less than 0.1.

Even if the specific gravity of the container is less than 1.0, the weight of the solid sanitizing pool chemical will keep the container below the water level in the skimmer until substantially all of the solid pool chemical is dissolved. Moreover, when the skimmer is in operation, the movement of water through the skimmer also assists in keeping the container submerged below the water level—even when it contains no solid sanitizing pool chemical.

The indicator plate member 4 is fabricated from any suitable material that is chemically resistant to the swimming pool chemical. Resins such as those described with respect to the fabrication of the container may be used provided that the specific gravity of the plate member is less than 1.0, which allows it to float to the top of container 1 when substantially all of the swimming pool chemical has been dissolved.

Materials contemplated for use to fabricate plate member 4 are foamed poly(vinyl chloride), polyethylene (foamed or solid), and polypropylene (foamed or solid). Preferably, the specific gravity of the plate member 4 is close to but less than 0.1. Too low of a specific gravity will cause plate member 4 to rise within container 1 while, for example tablets, of sanitizing pool chemical remain in the container. In such a case, it is possible for plate member 4 to flip over on top of the remaining solid swimming pool chemical, thereby eclipsing (blinding or isolating) any remaining tablets and giving a false indication of the need to refill container 1. Most preferably, the specific gravity of plate member 4 is such that it remains below the solid swimming pool chemical resting on top of the plate member until substantially all of the solid swimming pool chemical is dissolved.

Plate member 4 is relatively thin, e.g., between 0.2 and 20 millimeters, preferably between 1 and 4 millimeters. The thickness of the plate member is not critical. A very thin plate member may not be sufficiently stiff and easily bent or folded; whereas, a very thick plate member will not add to the function of the plate member but will occupy space that could be occupied otherwise by the swimming pool chemical, thereby reducing the amount of swimming pool chemical that is available for sanitizing the pool water and perhaps requiring more frequent refilling of the dispensing container.

Plate member 4 may be of any suitable shape and is preferably of a size larger than the dispensing opening 11 in the lid 7 of container 1 so that the plate remains within container 1 and does not float out into the skimmer. For example, the plate member 4 may be 8 centimeters in diameter and placed in a container 1 that is 8.25 centimeters in diameter. As shown in FIG. 1, plate member 4 is substantially flat and in the form of a circular disk, although it can be curvilinear in shape. Moreover, the plate member need not be flat, but can be of varying geometric shapes.

The plate member is of a color or has color markings that are readily discernible when the plate member is submerged in clear water, e.g., swimming pool water, and visually observed from above the water level. While it is preferred that plate member 4 be all one color, any color marking of the plate member that is readily discernible through the dispensing opening of the container may be used, e.g., dots, circles, lines, etc.

The plate member is preferably of a color which is relatively dark so that it can be easily and readily seen through the dispensing opening when the container is under water. It should also be of a color that is distinctive and different from the sanitizing chemical charged to the container 1. Colors such as red, blue or dark green may be used. The specific color is not critical and other than being a color that is readily observable when the plate member is submerged in water, does not add to the other functions of the plate member.

Container 1 has a removable cover or lid 7, which has a dispensing opening 11 that may be closed by means of movable closure 13 which is mounted inside lid 7 for rotation in a horizontal plane parallel to the top surface of lid 7. A tab 15 on closure 13 allows the operator to rotate the closure from a full open position to a full closed position or to any intermediate position. In FIG. 2, the closure device is shown in a half-closed position, and a broken line indicates a position where the closure is in an almost full open position. Lid 7 has a side wall 6. The lower inside portion of side wall 6 has internal threads 12 which match the external threads 10 on the upper outside portion of side 3 of container 1. Such threads allow lid 7 to be screwed onto and fastened tightly to container 1.

In operation and as shown in FIG. 4, indicator plate 4 is placed on the bottom of container 1 and the container is filled with swimming pool chemical 8, preferably solid pellets, briquettes or tablets of calcium hypochlorite or a chloroisocyanurate. Top 7 is threaded on the container and tightened. The adjustable closure 13 is rotated by means of tab 15 so that the dispensing opening 11 in the top 7 is set to the desired degree of opening, and the container then placed within the skimmer basket.

Figure 6:
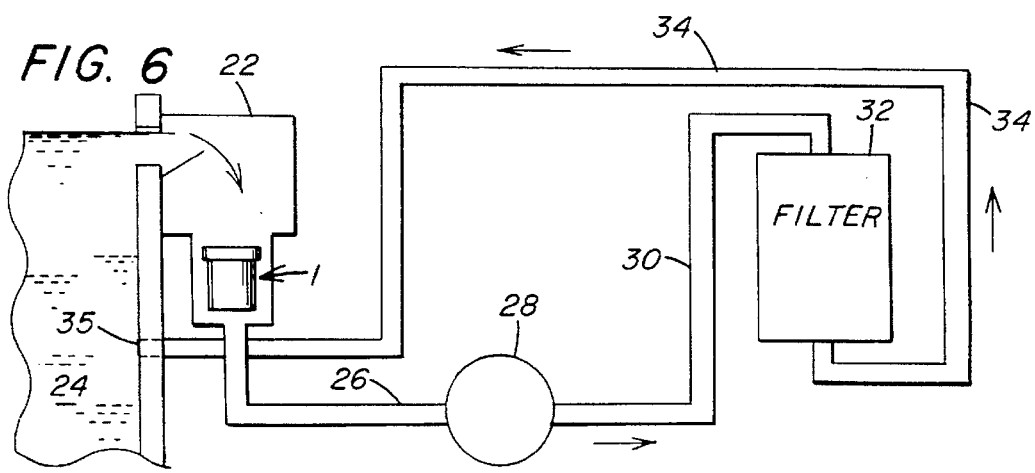
FIG. 6 is a schematic layout of the dispenser and skimmer of FIG. 3 associated with a swimming pool and connected sequentially by piping to a pump and filter, the output from the filter being returned by piping to the pool.

As shown in FIG. 6, the skimmer 22 adjacent to the pool is connected to a full flow circuit which typically includes a pump 28, a filter 32 and the pool 24, with piping connecting all of the components. As shown water enters the skimmer 22, is drawn by pump 28 from the skimmer through conduit 26 and forwarded to filter 32 through conduit 30. Water exiting the filter 32 is recycled to pool 24 through conduit 34, usually through a submerged jet 35. Water is circulated continuously through this flow circuit.

Figure 3:
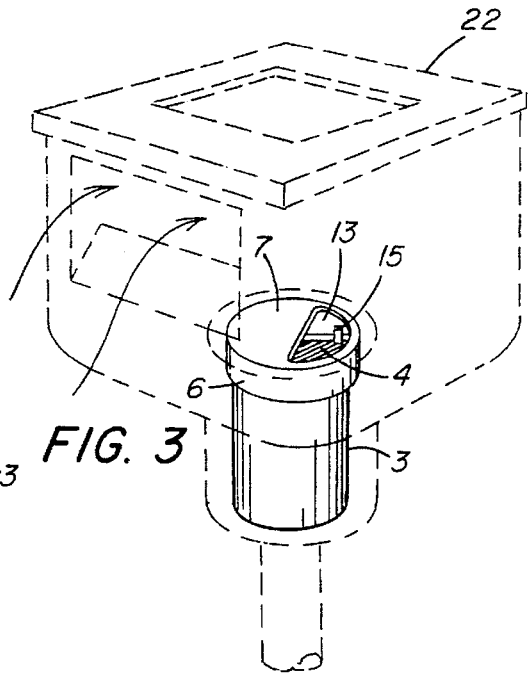
FIG. 3 is an isometric view of the dispenser of FIG. 1 installed in a skimmer shown in phantom.

The circulation of water, while the pump is running, causes the water to pass through the skimmer and by container 1, which is filled with the solid pool sanitizing chemical (as shown in FIGS. 3 and 4). The pool chemical is dissolved in the water circulating through the skimmer, and water containing the sanitizing chemical passes out of the dispensing opening 11 of the container and into the pool flow circuit. When the pool chemical is substantially dissolved, the colored plate member 4 will rise from the bottom of the container to the top of the container and float there adjacent to the dispensing opening in the lid where it can be readily visually observed (as shown in FIG. 5), thereby indicating to the pool user that the container is in need of being refilled.

Although the present invention has been described with reference to specific details of certain preferred embodiments thereof, it is not intended that such detail should be regarded as limitations upon the scope of the invention except as and to the extent that they are included in the accompanying claims. The scope of the appended claims is intended to encompass all obvious changes in the details, materials and arrangement of parts which will occur to one of skill in the art upon the reading of the disclosure.

What is claimed is:

1. A dispenser for dispensing a solid swimming pool chemical into water when the dispenser is immersed in water comprising, in combination,
   (a) a container for holding the pool chemical, said container having a closed bottom and a lid with a dispensing opening, and
   (b) a plate member having
      (1) a specific gravity of less than 1.0,
      (2) a color marking that is readily discernible when the member is covered with water, and
      (3) a size larger than the opening in the lid, said plate member being contiguous to the bottom of the container and being freely movable vertically.

2. The dispenser of claim 1 wherein the container is cylindrical and the plate member is a substantially flat circular disk.

3. The dispenser of claim 2 wherein the edge of the plate member is close to but spaced from the side wall of the container.

4. The dispenser of claim 3 wherein the plate member is from 1 to 3 millimeters thick.

5. The dispenser of claim 3 wherein the plate member is colored red.

6. The dispenser of claim 3 wherein the plate member is covered with solid swimming pool chemical.

7. The dispenser of claim 6 wherein the swimming pool chemical is calcium hypochlorite.

8. The dispenser of claim 3 wherein the plate member is thermoplastic polypropylene.

9. The dispenser of claim 8 wherein the plate member is from 1 to 3 millimeters thick.

10. The dispenser of claim 9 wherein the plate member is covered with solid calcium hypochlorite tablets.

* * * * *